United States Patent
Iguchi

(10) Patent No.: US 11,646,160 B2
(45) Date of Patent: May 9, 2023

(54) ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/463,964

(22) Filed: Sep. 1, 2021

(65) Prior Publication Data
US 2022/0122776 A1 Apr. 21, 2022

(30) Foreign Application Priority Data

Oct. 21, 2020 (JP) .............................. JP2020-176804

(51) Int. Cl.
*H01G 4/30* (2006.01)
*H01G 4/232* (2006.01)
*H01G 4/12* (2006.01)

(52) U.S. Cl.
CPC ............. *H01G 4/30* (2013.01); *H01G 4/2325* (2013.01); *H01G 4/12* (2013.01)

(58) Field of Classification Search
CPC ....... H01G 4/228; H01G 4/232; H01G 4/2325
See application file for complete search history.

(56) References Cited

U.S. PATENT DOCUMENTS

| 6,381,117 | B1 * | 4/2002 | Nakagawa | H01G 2/14 |
| | | | | 361/306.3 |
| 2010/0067170 | A1 * | 3/2010 | Koga | H01G 4/232 |
| | | | | 29/25.42 |
| 2015/0162132 | A1 * | 6/2015 | Kwag | H01G 4/2325 |
| | | | | 361/301.4 |
| 2017/0294268 | A1 * | 10/2017 | Katsuta | H01G 4/232 |
| 2018/0174753 | A1 * | 6/2018 | Terashita | H01G 4/008 |

FOREIGN PATENT DOCUMENTS

| JP | 2010-226017 A | 10/2010 | |
| WO | WO-03075295 A1 * | 9/2003 | ........... H01G 4/2325 |
| WO | WO-2021220976 A1 * | 11/2021 | |

* cited by examiner

*Primary Examiner* — Eric W Thomas
(74) *Attorney, Agent, or Firm* — Oliff PLC

(57) ABSTRACT

An electronic component includes an element body including a side surface and an end surface adjacent to each other, and an external electrode disposed on the side surface and the end surface. The external electrode includes a metal layer disposed on the side surface and the end surface and made of sintered copper, a conductive resin layer that is disposed on the metal layer in such a manner that a partial region of the metal layer is exposed and contains a plurality of copper particles and a resin, and a plating layer disposed on the partial region of the metal layer and the conductive resin layer. The conductive resin includes a first portion located on the side surface. The plating layer includes a second portion located on the side surface. A thickness of the first portion is smaller than a thickness of the second portion.

5 Claims, 10 Drawing Sheets

Fig.9

| SAMPLE | $T_{E2}$ ($\mu$m) | $T_{PL}$ ($\mu$m) | $T_{E1}$ ($\mu$m) | OCCURRENCE OF FLEX CRACK | ESR ($\Omega$) |
|---|---|---|---|---|---|
| S1 | 8 | 10 | 3 | 0/10 | 6.6 |
| S2 | 12 | 8 | 3 | 0/10 | 14.1 |
| S3 | 4 | 11 | 9 | 1/10 | 7.8 |

*Fig.10*

| SAMPLE | AVERAGE ASPECT RATIO OF COPPER PARTICLES | ESR ($\Omega$) |
|---|---|---|
| S4 | 1.12 | 9.8 |
| S5 | 1.39 | 6.6 |
| S6 | 1.63 | 6.1 |

ELECTRONIC COMPONENT

BACKGROUND OF THE INVENTION

1. Field of the Invention

The present invention relates to an electronic component.

2. Description of Related Art

Known electronic components include an element body including a side surface and an end surface adjacent to each other, and an external electrode disposed on the side surface and the end surface (for example, see Japanese Unexamined Patent Publication No. 2010-226017). The external electrode includes a metal layer, a conductive resin layer, and a plating layer. The metal layer is disposed on the side surface and the end surface. The conductive resin layer is disposed on the metal layer in such a manner that a partial region of the metal layer is exposed. The plating layer is disposed on the partial region of the metal layer and the conductive resin layer.

SUMMARY OF THE INVENTION

An object of an aspect of the invention is to provide an electronic component reducing electrical resistance and controlling occurrence of a flex crack and migration.

An electronic component according to one aspect includes an element body including a side surface and an end surface adjacent to each other, and an external electrode disposed on the side surface and the end surface. The external electrode includes a metal layer, a conductive resin layer, and a plating layer. The metal layer is disposed on the side surface and the end surface and made of sintered copper. The conductive resin layer is disposed on the metal layer in such a manner that a partial region of the metal layer is exposed and contains a plurality of copper particles and a resin. The plating layer is disposed on the partial region of the metal layer and the conductive resin layer. The conductive resin layer includes a first portion located on the side surface. The plating layer includes a second portion located on the side surface. A thickness of the first portion is smaller than a thickness of the second portion.

When an electronic device flexes in a state where the electronic component is solder-mounted on the electronic device, stress (flex stress) may act on the electronic component from the electronic device. In this case, a crack may occur in the element body. This crack is referred to as a flex crack. For example, stress tends to act on the side surface of the element body. For example, the electronic device includes a circuit board or an electronic component.

In the one aspect, the external electrode includes the conductive resin layer including the first portion. Therefore, the stress acting on electronic component from the electronic device tends not to act on the element body. Consequently, the one aspect reliably controls the occurrence of the flex crack.

The conductive resin layer contains the resin. Therefore, the electrical resistance of the conductive resin layer is higher than the electrical resistance of the metal layer and the plating layer.

In the one aspect, the plating layer is disposed on the partial region of the metal layer exposed from the conductive resin layer. Therefore, a current path not passing through the conductive resin layer is formed between the plating layer and the metal layer. Consequently, the one aspect controls an increase in electrical resistance.

In the one aspect, the thickness of the first portion of the conductive resin layer is smaller than the thickness of the second portion of the plating layer. Therefore, the current path formed by the copper particles in the conductive resin layer is extremely short. Consequently, even in a case where the external electrode includes the conductive resin layer, the one aspect reduces the electrical resistance.

Stress generated when the plating layer is formed may act on the first portion of the conductive resin layer. In a case where this stress acts on the first portion of the conductive resin layer, the first portion of the conductive resin layer may peel off from the element body. The smaller the thickness of the first portion of the conductive resin layer, the easier it is for the first portion to peel off from the element body. In this case, migration due to metal particles contained in the conductive resin layer tends to occur.

In the one aspect, the conductive resin layer contains copper particles as metal particles. Therefore, in the one aspect, migration tends not to occur as compared with in a configuration in which the conductive resin layer contains silver particles as metal particles.

In the one aspect, the metal layer may include a third portion located on the side surface. A thickness of the third portion may be smaller than the thickness of the first portion.

The stress acting on the electronic component from the electronic device acts on the element body from the metal layer. The thicker the metal layer, the greater the stress acting on the element body. In a configuration in which the thickness of the third portion of the metal layer is smaller than the thickness of the first portion of the conductive resin layer, the stress acting on the element body is small. Therefore, this configuration further reliably controls the occurrence of the flex crack.

In the aspect, an average aspect ratio of the plurality of copper particles may be 1.1 or more.

In a configuration in which the average aspect ratio of the plurality of copper particles is less than 1.1, surfaces of the copper particles tend to be oxidized. In this case, the electrical resistance of the conductive resin layer may increase. In contrast, in a configuration in which the average aspect ratio of the plurality of copper particles is 1.1 or more, the electrical resistance of the conductive resin layer tends not to increase.

In the aspect, the element body may include a ridge portion between the side surface and the end surface. The partial region of the metal layer may include a fourth portion located on the ridge portion.

The conductive resin layer alleviates stress acting on a solder fillet formed on the external electrode and controls an occurrence of a solder crack. The stress acting on the solder fillet tends to be concentrated on the solder fillet formed in a part of the external electrode located on the end surface and the side surface. In contrast, stress tends not to act on the solder fillet formed in a part of the external electrode located on the ridge portion between the side surface and the end surface.

As described above, even though the stress acting on the electronic component from the electronic device tends to act on the side surface, the stress tends not to act on the ridge portion between the side surface and the end surface.

In a configuration in which the partial region of the metal layer includes the fourth portion, the fourth portion is exposed from the conductive resin layer and is connected to the plating layer. Therefore, this configuration reduces the electrical resistance and controls the occurrence of the solder crack as well as the flex crack.

In the aspect, glass may exist between the ridge portion and the fourth portion.

In the electronic component, in general, the element body contains an oxide. Copper tends not to oxidize as compared with metal such as nickel or aluminum. In this case, the metal layer made of sintered copper tends not to be chemically connected to the element body containing the oxide.

In the configuration in which the glass exists between the ridge portion and the fourth portion, the element body and the metal layer are firmly connected at the ridge portion. Therefore, the element body and the external electrode are firmly connected.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a table illustrating occurrence of flex crack and equivalent series resistance (ESR) in each sample; and FIG. 10 is a table illustrating ESR in each sample.

DETAILED DESCRIPTION OF EMBODIMENTS

Figure 1:
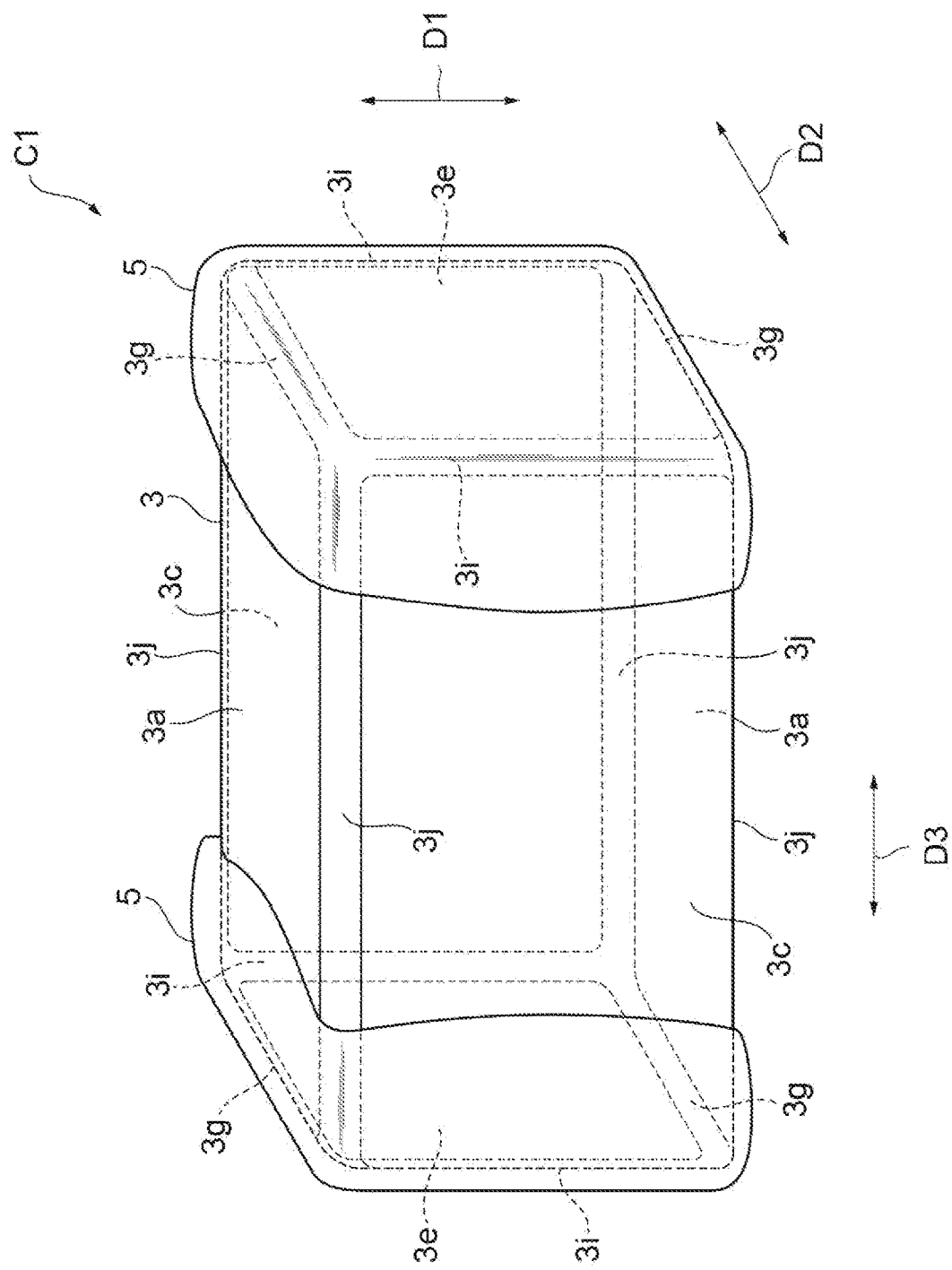
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
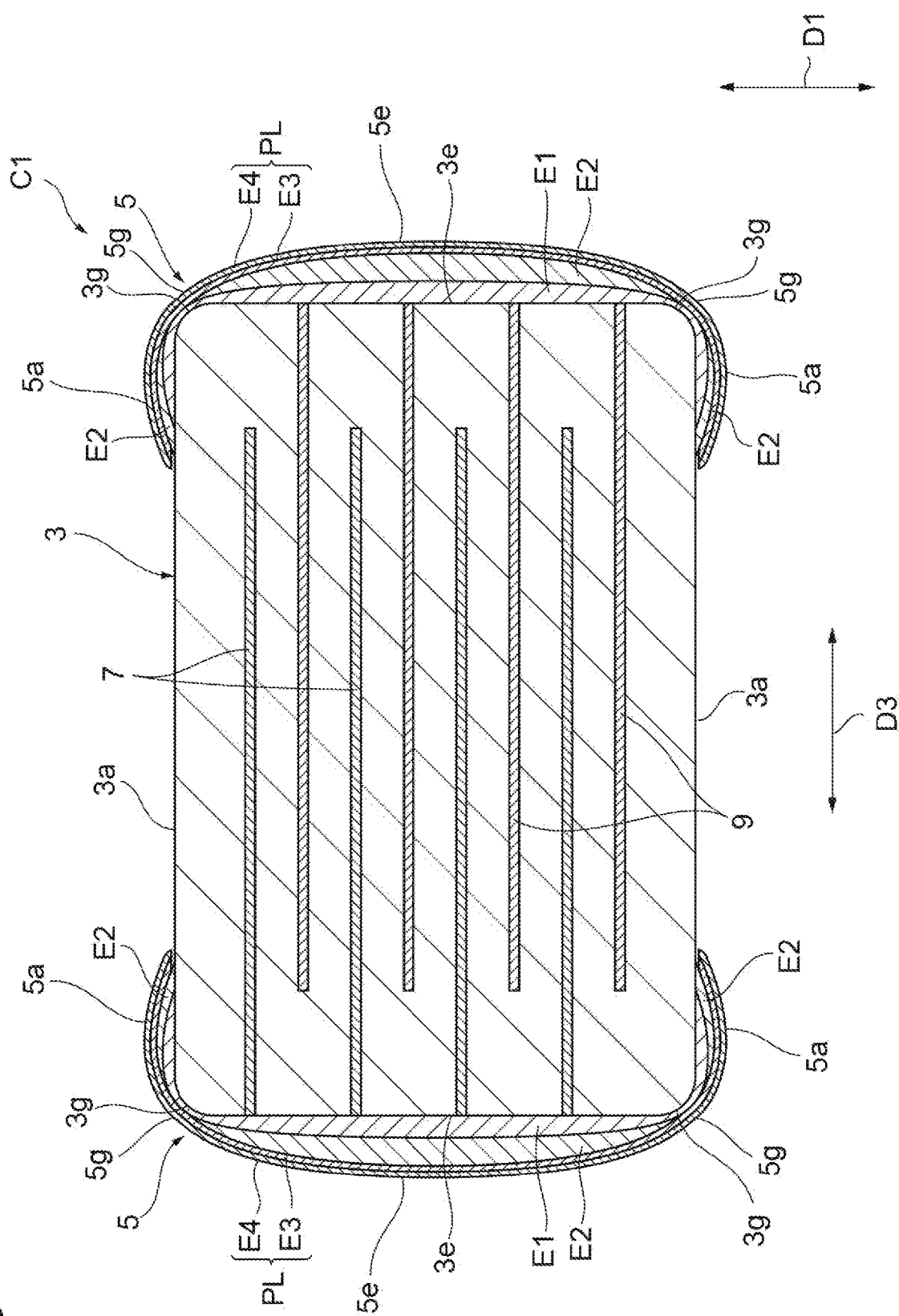
FIG. 2 is a view illustrating a cross-sectional configuration of the multilayer capacitor according to the embodiment.
Figure 3:
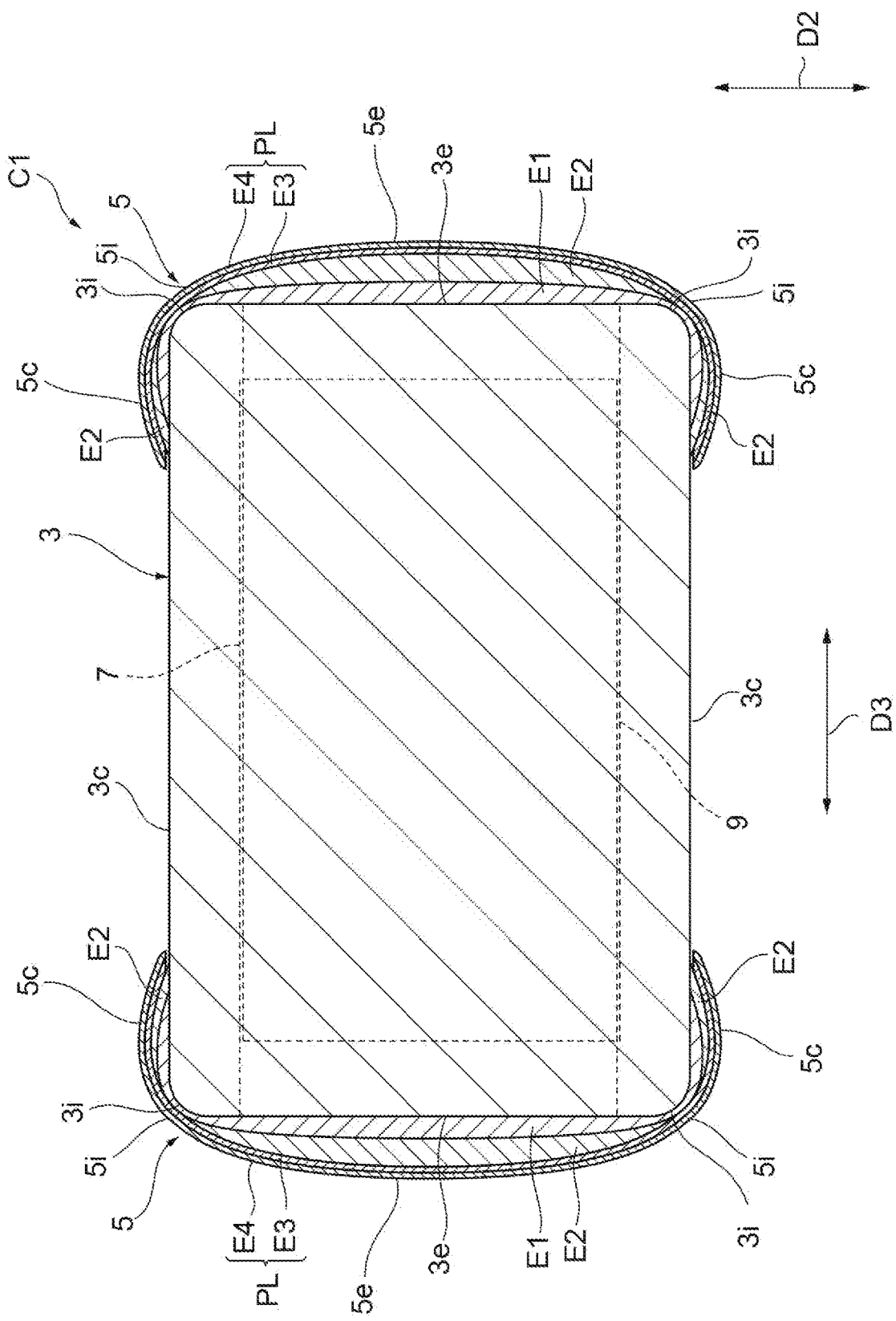
FIG. 3 is view illustrating a cross-sectional configuration of the multilayer capacitor according to the embodiment.
Figure 4:
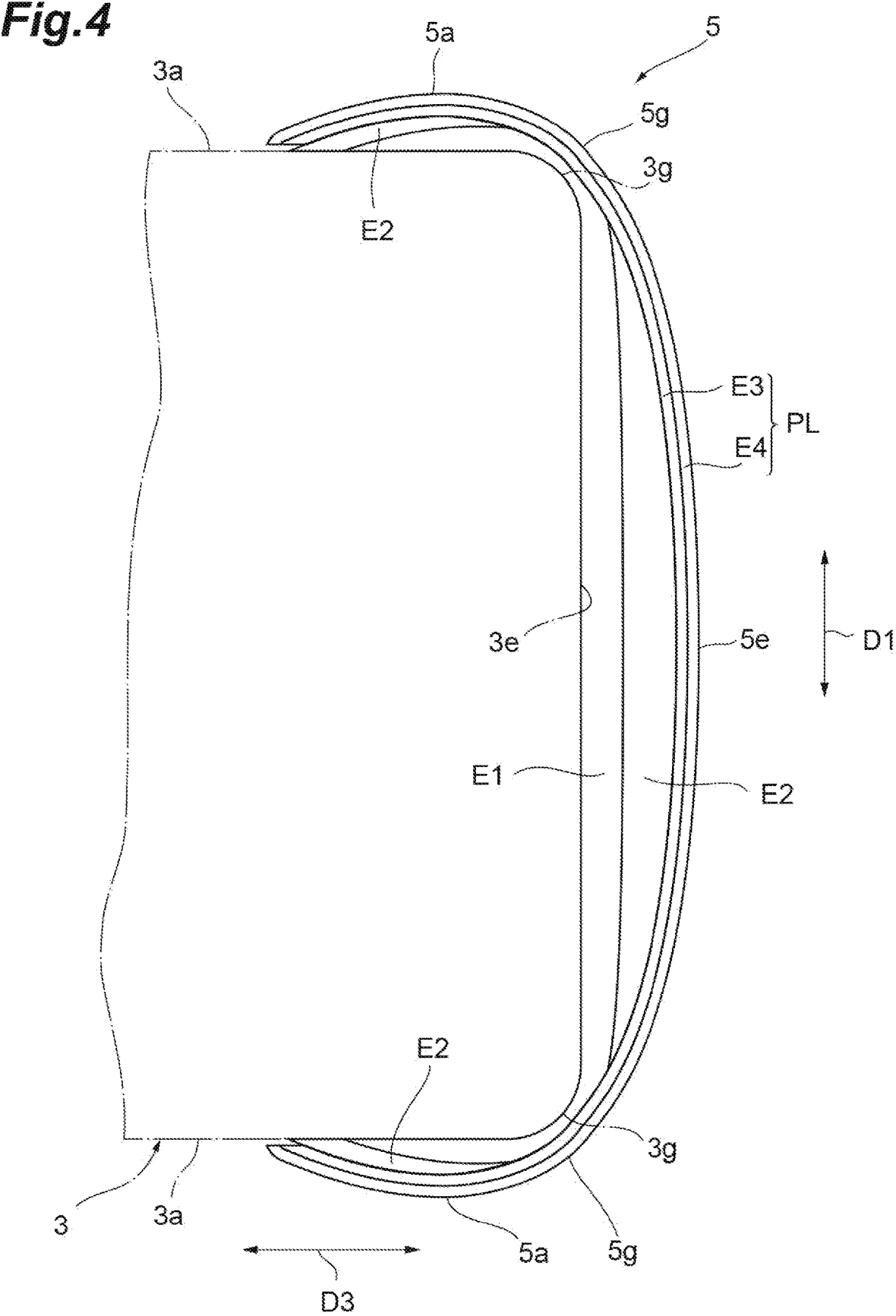
FIG. 4 is a view illustrating a cross-sectional configuration of an external electrode.
Figure 5:
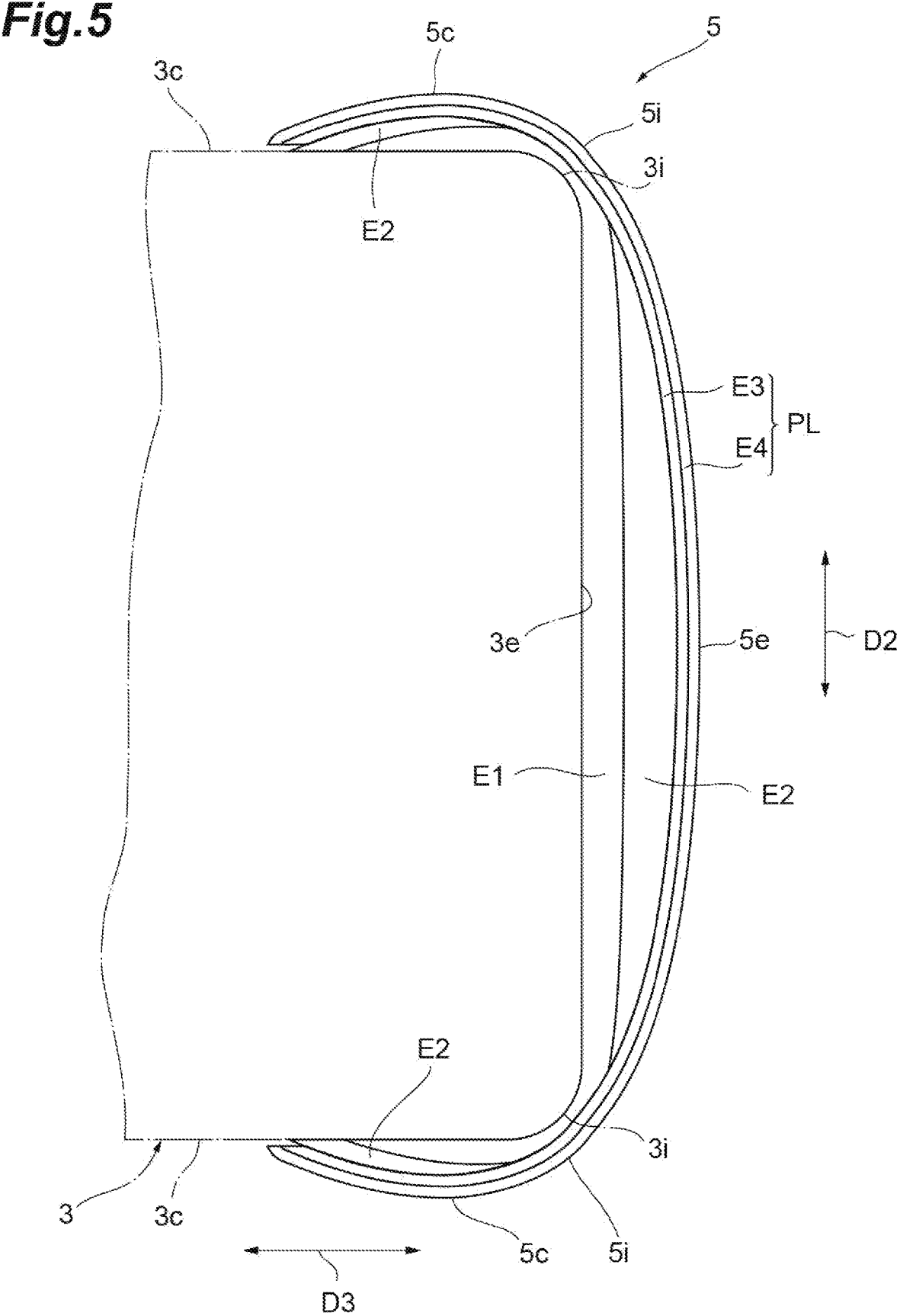
FIG. 5 is a view illustrating a cross-sectional configuration of the external electrode.
Figure 6:
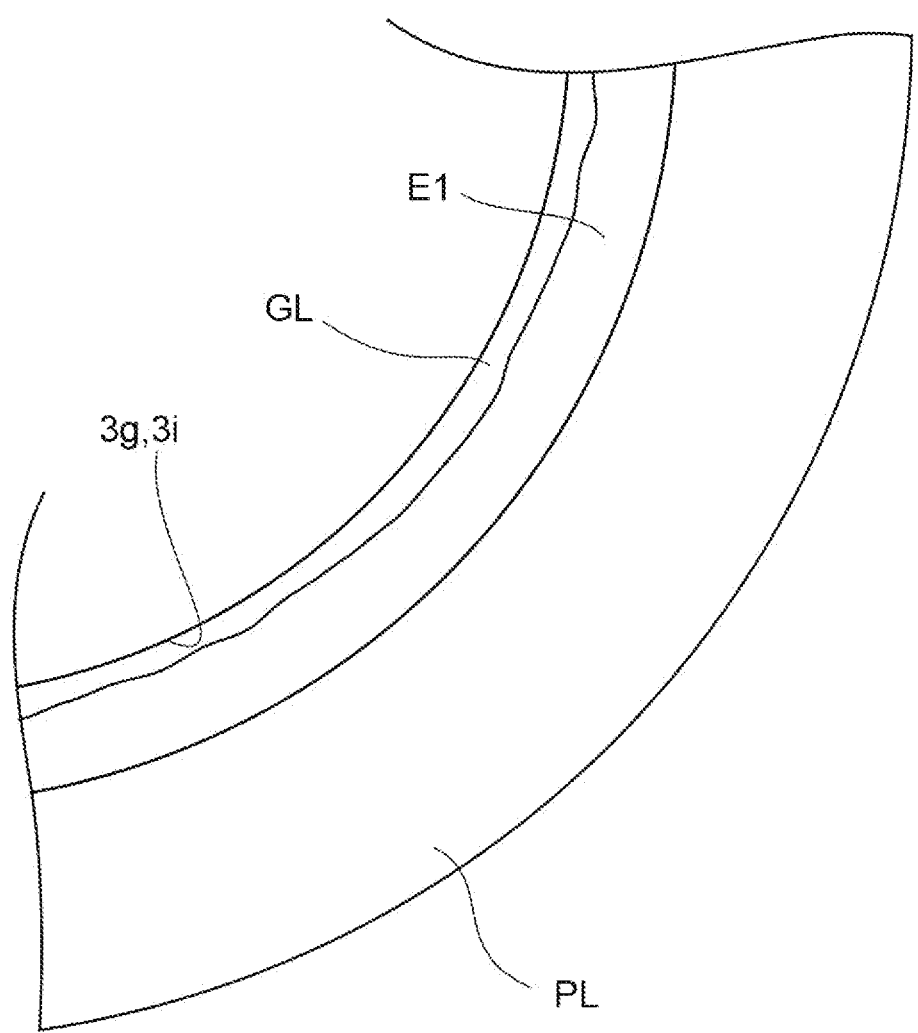
FIG. 6 is a view illustrating a cross-sectional configuration of the external electrode.
Figure 7:
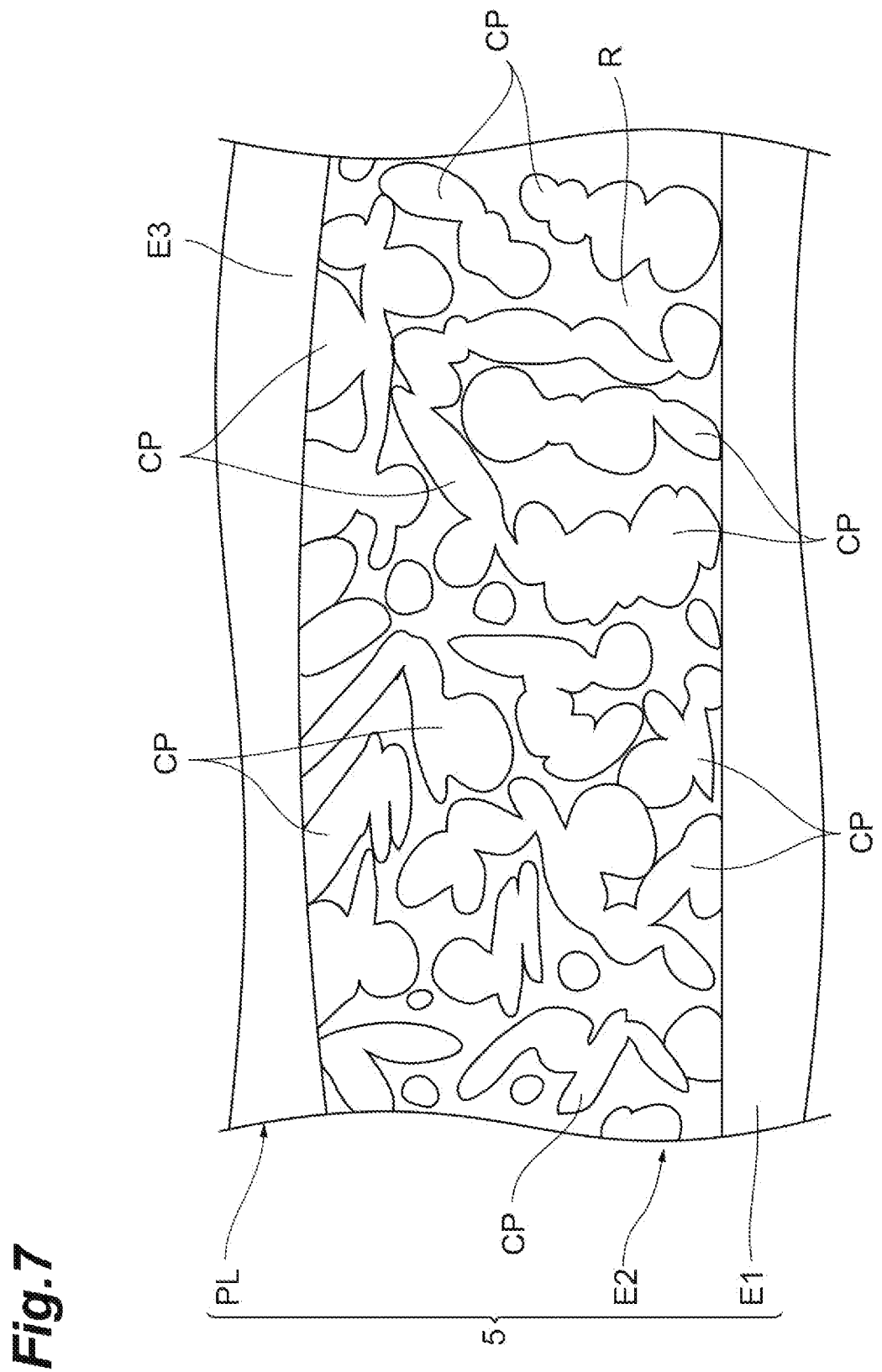
FIG. 7 is a schematic view illustrating a cross-sectional configuration of the external electrode.
Figure 8:
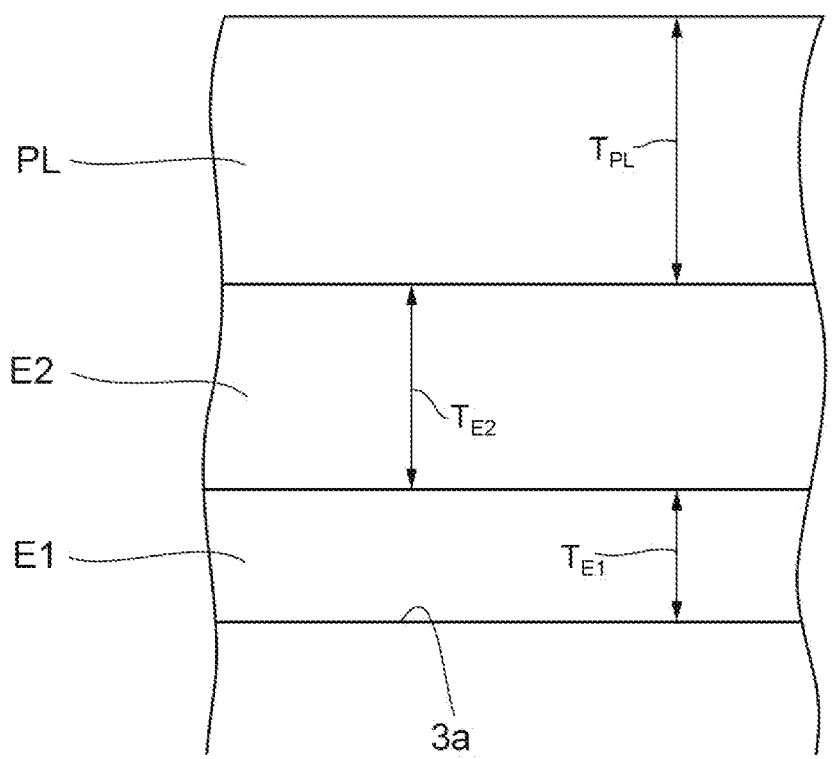
FIG. 8 is a schematic view illustrating a cross-sectional configuration of the external electrode.

A configuration of a multilayer capacitor C1 according to an embodiment will be described with reference to FIGS. 1 to 8. FIG. 1 is a perspective view of a multilayer capacitor according to the embodiment. FIGS. 2 and 3 are views illustrating a cross-sectional configuration of the multilayer capacitor according to the embodiment. FIGS. 4 to 6 are views illustrating a cross-sectional configuration of an external electrode. FIGS. 7 and 8 are schematic views illustrating a cross-sectional configuration of the external electrode. In FIGS. 4 to 8, hatching representing a cross section is omitted. In the present embodiment, an electronic component includes, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of side surfaces 3a opposing each other, a pair of side surfaces 3c opposing each other, and a pair of end surfaces 3e opposing each other. The pair of side surfaces 3a, the pair of side surfaces 3c, and the pair of end surfaces 3e have a rectangular shape. A direction in which the pair of side surfaces 3a opposes each other is a first direction D1. A direction in which the pair of side surfaces 3c opposes each other is a second direction D2. A direction in which the pair of end surfaces 3e opposes each other is a third direction D3. The multilayer capacitor C1 is solder-mounted on an electronic device. The electronic device includes, for example, a circuit board or an electronic component. One side surface 3a of the multilayer capacitor C1 opposes the electronic device. The one side surface 3a is arranged to constitute a mounting surface. The one side surface 3a is the mounting surface. One side surface 3c of the pair of side surfaces 3c may be arranged to constitute a mounting surface.

The first direction D1 is a direction orthogonal to the respective side surfaces 3a and is orthogonal to the second direction D2. The third direction D3 is a direction parallel to the respective side surfaces 3a and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, the element body 3 has a height of 0.1 to 2.5 mm, a width of 0.1 to 5.0 mm, and a length of 0.2 to 5.7 mm. The element body 3 has, for example, a height of 1.6 mm, a width of 1.6 mm, and a length of 3.2 mm.

The pair of side surfaces 3c extends in the first direction D1 to couple the pair of side surfaces 3a. The pair of side surfaces 3c also extends in the third direction D3. The pair of end surfaces 3e extends in the first direction D1 to couple the pair of side surfaces 3a. The pair of end surfaces 3e extends in the second direction D2.

The element body 3 includes four ridge portions 3g, four ridge portions 3i, and four ridge portions 3j. The ridge portion 3g is positioned between the end surface 3e and the side surface 3a. The ridge portion 3i is positioned between the end surface 3e and the side surface 3c. The ridge portion 3j is positioned between the side surface 3a and the side surface 3c. In the present embodiment, each of the ridge portions 3g, 3i, and 3j is rounded to curve. The element body 3 is subject to what is called a round chamfering process. The end surface 3e and the side surface 3a are indirectly adjacent to each other with the ridge portion 3g between the end surface 3e and the side surface 3a. The end surface 3e and the side surface 3c are indirectly adjacent to each other with the ridge portion 3i between the end surface 3e and the side surface 3c. The side surface 3a and the side surface 3c are indirectly adjacent to each other with the ridge portion 3j between the side surface 3a and the side surface 3c.

The element body 3 is configured through laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic. The dielectric ceramic includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2. In the present embodiment, the element body 3 includes oxide.

As illustrated in FIGS. 2 and 3, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. In the present embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. The internal electrodes 7 and the internal electrodes 9 are arranged to have different polarities from each other. In a case where the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed to a corresponding end surface 3e of the pair of end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The internal electrodes 7 and 9 are positioned in a plane approximately parallel to the side surfaces 3a. The internal electrodes 7 and the internal electrodes 9 oppose each other in the first direction D1. The direction (first direction D1) in which the internal electrodes 7 and the internal electrodes 9 oppose each other is orthogonal to the directions (second direction D2 and third direction D3) parallel to the side surfaces 3a. In a case where the lamination direction of the plurality of dielectric layers is the second direction D2, the plurality of internal electrodes 7 and the plurality of internal electrodes 9 are alternately disposed in the second direction D2. In which case, the internal electrodes 7 and 9 are positioned in a plane approximately orthogonal to the side surfaces 3a. The internal electrodes 7 and the internal electrodes 9 oppose each other in the second direction D2.

As illustrated in FIG. 1, the external electrodes 5 are disposed at both end portions of the element body 3 in the third direction D3. Each of the external electrodes 5 is disposed on the corresponding end surface 3e side of the element body 3. In the present embodiment, each of the external electrodes 5 is disposed on the pair of side surfaces 3a, the pair of side surfaces 3c, and the end surface 3e. As illustrated in FIGS. 2 and 3, the external electrode 5 includes a plurality of electrode portions 5a, 5c, 5e, 5g, and 5i. Each of the electrode portions 5a is disposed on a corresponding side surface 3a of the side surfaces 3a. Each of the electrode portions 5c is disposed on a corresponding side surface 3c of the side surfaces 3c. The electrode portion 5e is disposed on the corresponding end surface 3e. Each of the electrode portions 5g is disposed on a corresponding ridge portion 3g of the ridge portions 3g. Each of the electrode portions 5i is disposed on a corresponding ridge portion 3i of the ridge portions 3i. The external electrode 5 also includes electrode portions disposed on the ridge portions 3j.

The external electrode 5 is formed on the five surfaces, that is, the pair of side surfaces 3a, the end surface 3e, and the pair of side surfaces 3c, as well as on the ridge portions 3g, 3i, and 3j. The electrode portions 5a, 5c, 5e, 5g, and 5i adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. The external electrode 5 includes a first electrode layer E1, a second electrode layer E2, and a plating layer PL. The plating layer PL includes a third electrode layer E3 and a fourth electrode layer E4. The fourth electrode layer E4 is arranged to constitute the outermost layer of the external electrode 5. In the present embodiment, each of the electrode portions 5a, 5c, and 5e includes the first electrode layer E1, the second electrode layer E2, the third electrode layer E3, and the fourth electrode layer E4, and each of the electrode portions 5g and 5i includes the first electrode layer E1, the third electrode layer E3, and the fourth electrode layer E4.

As illustrated in FIG. 4, the first electrode layer E1 included in the electrode portion 5a is disposed on the side surface 3a. The first electrode layer E1 included in the electrode portion 5a is formed to cover one part of the side surface 3a. The first electrode layer E1 included in the electrode portion 5a is in contact with the one part of the side surface 3a. The side surface 3a is covered with the first electrode layer E1 at the above-described one part, and is exposed from the first electrode layer E1 at the remaining part except the above-described one part. The one part of the side surface 3a is a partial region near the end surface 3e, in the side surface 3a. That is, the one part of the side surface 3a is close to the end surface 3e. The first electrode layer E1 included in the electrode portion 5a is positioned on the side surface 3a.

The second electrode layer E2 included in the electrode portion 5a is disposed on the first electrode layer E1. In the electrode portion 5a, the second electrode layer E2 is formed to cover the first electrode layer E1 and a part of the side surface 3a. In the electrode portion 5a, the second electrode layer E2 is in direct contact with the first electrode layer E1 and the side surface 3a. The second electrode layer E2 included in the electrode portion 5a is formed to cover the entire first electrode layer E1 included in the electrode portion 5a. In the electrode portion 5a, the second electrode layer E2 indirectly covers the side surface 3a in such a manner that the first electrode layer E1 is positioned between the second electrode layer E2 and the side surface 3a. The second electrode layer E2 included in the electrode portion 5a is positioned on the side surface 3a.

The third electrode layer E3 included in the electrode portion 5a is disposed on the second electrode layer E2. In the electrode portion 5a, the third electrode layer E3 covers the entire second electrode layer E2. In the electrode portion 5a, the third electrode layer E3 is in contact with the entire second electrode layer E2. That is, in the electrode portion 5a, the third electrode layer E3 is in direct contact with the second electrode layer E2. In the electrode portion 5a, the third electrode layer E3 is not in direct contact with the first electrode layer E1. The third electrode layer E3 included in the electrode portion 5a is positioned on the side surface 3a.

The fourth electrode layer E4 included in the electrode portion 5a is disposed on the third electrode layer E3. In the electrode portion 5a, the fourth electrode layer E4 covers the entire third electrode layer E3. In the electrode portion 5a, the fourth electrode layer E4 is in contact with the entire third electrode layer E3. That is, in the electrode portion 5a, the fourth electrode layer E4 is in direct contact with the third electrode layer E3. The fourth electrode layer E4 included in the electrode portion 5a is positioned on the side surface 3a.

The electrode portion 5a is four-layered.

As illustrated in FIG. 5, the first electrode layer E1 included in the electrode portion 5c is disposed on the side surface 3c. The first electrode layer E1 included in the electrode portion 5c is formed to cover one part of the side surface 3c. The first electrode layer E1 included in the electrode portion 5c is in contact with the one part of the side surface 3c. The side surface 3c is covered with the first electrode layer E1 at the above-described one part, and is exposed from the first electrode layer E1 at the remaining part except the above-described one part. The one part of the side surface 3c is a partial region near the end surface 3e, in the side surface 3c. That is, the one part of the side surface 3c is close to the end surface 3e. The first electrode layer E1 included in the electrode portion 5c is positioned on the side surface 3c.

The second electrode layer E2 included in the electrode portion 5c is disposed on the first electrode layer E1. In the electrode portion 5c, the second electrode layer E2 is formed to cover the first electrode layer E1 and a part of the side surface 3c. In the electrode portion 5c, the second electrode layer E2 is in direct contact with the first electrode layer E1 and the side surface 3c. The second electrode layer E2 included in the electrode portion 5c is formed to cover the entire first electrode layer E1 included in the electrode portion 5c. In the electrode portion 5c, the second electrode layer E2 indirectly covers the side surface 3c in such a manner that the first electrode layer E1 is positioned between the second electrode layer E2 and the side surface 3c. The second electrode layer E2 included in the electrode portion 5c is positioned on the side surface 3c.

The third electrode layer E3 included in the electrode portion 5c is disposed on the second electrode layer E2. In the electrode portion 5c, the third electrode layer E3 covers the entire second electrode layer E2. In the electrode portion 5c, the third electrode layer E3 is in contact with the entire second electrode layer E2. That is, in the electrode portion 5c, the third electrode layer E3 is in direct contact with the second electrode layer E2. In the electrode portion 5c, the third electrode layer E3 is not in direct contact with the first electrode layer E1. The third electrode layer E3 included in the electrode portion 5c is positioned on the side surface 3a.

The fourth electrode layer E4 included in the electrode portion 5c is disposed on the third electrode layer E3. In the electrode portion 5c, the fourth electrode layer E4 covers the entire third electrode layer E3. In the electrode portion 5c, the fourth electrode layer E4 is in contact with the entire third electrode layer E3. That is, in the electrode portion 5c, the fourth electrode layer E4 is in direct contact with the third electrode layer E3. The fourth electrode layer E4 included in the electrode portion 5c is positioned on the side surface 3a.

The electrode portion 5c is four-layered.

As illustrated in FIGS. 4 and 5, the first electrode layer E1 included in the electrode portion 5e is disposed on the end surface 3e. The first electrode layer E1 included in the electrode portion 5e covers the entire end surface 3e. The first electrode layer E1 included in the electrode portion 5e is in contact with the entire end surface 3e. In the electrode portion 5e, the first electrode layer E1 is formed on the end surface 3e to be coupled to the one ends of the corresponding internal electrodes 7 or 9. The first electrode layer E1 included in the electrode portion 5e is positioned on the end surface 3e.

The second electrode layer E2 included in the electrode portion 5e is disposed on the first electrode layer E1. In the electrode portion 5e, the second electrode layer E2 is in contact with the entire first electrode layer E1. In the electrode portion 5e, the second electrode layer E2 is formed to cover the entire first electrode layer E1. The second electrode layer E2 included in the electrode portion 5e indirectly covers the end surface 3e in such a manner that the first electrode layer E1 is positioned between the second electrode layer E2 and the end surface 3e. The second electrode layer E2 included in the electrode portion 5e directly covers the entire first electrode layer E1. The second electrode layer E2 included in the electrode portion 5e is positioned on the end surface 3e.

The third electrode layer E3 included in the electrode portion 5e is disposed on the second electrode layer E2. In the electrode portion 5e, the third electrode layer E3 covers the entire second electrode layer E2. In the electrode portion 5e, the third electrode layer E3 is in contact with the entire second electrode layer E2. That is, in the electrode portion 5e, the third electrode layer E3 is in direct contact with the second electrode layer E2. In the electrode portion 5e, the third electrode layer E3 is not in direct contact with the first electrode layer E1. The third electrode layer E3 included in the electrode portion 5e is positioned on the end surface 3e.

The fourth electrode layer E4 included in the electrode portion 5e is disposed on the third electrode layer E3. In the electrode portion 5e, the fourth electrode layer E4 covers the entire third electrode layer E3. In the electrode portion 5e, the fourth electrode layer E4 is in contact with the entire third electrode layer E3. That is, in the electrode portion 5e, the fourth electrode layer E4 is in direct contact with the third electrode layer E3. The fourth electrode layer E4 included in the electrode portion 5e is positioned on the end surface 3e.

The electrode portion 5e is four-layered.

As illustrated in FIG. 4, the first electrode layer E1 included in the electrode portion 5g is disposed on the ridge portion 3g. The first electrode layer E1 included in the electrode portion 5g is formed to cover the entire ridge portion 3g. The first electrode layer E1 included in the electrode portion 5g is in contact with the entire ridge portion 3g. The first electrode layer E1 included in the electrode portion 5g is positioned on the ridge portion 3g.

The third electrode layer E3 included in the electrode portion 5g is disposed on the first electrode layer E1. In the electrode portion 5g, the third electrode layer E3 covers the entire first electrode layer E1. In the electrode portion 5g, the third electrode layer E3 is in contact with the entire first electrode layer E1. That is, in the electrode portion 5g, the third electrode layer E3 is in direct contact with the first electrode layer E1. The third electrode layer E3 included in the electrode portion 5g is positioned on the ridge portion 3g.

The fourth electrode layer E4 included in the electrode portion 5g is disposed on the third electrode layer E3. In the electrode portion 5g, the fourth electrode layer E4 covers the entire third electrode layer E3. In the electrode portion 5g, the fourth electrode layer E4 is in contact with the entire third electrode layer E3. That is, in the electrode portion 5g, the fourth electrode layer E4 is in direct contact with the third electrode layer E3. The fourth electrode layer E4 included in the electrode portion 5g is positioned on the ridge portion 3g.

The electrode portion 5g is three-layered.

As illustrated in FIG. 5, the first electrode layer E1 included in the electrode portion 5i is disposed on the ridge portion 3i. The first electrode layer E1 included in the electrode portion 5i is formed to cover the entire ridge portion 3i. The first electrode layer E1 included in the electrode portion 5i is in contact with the entire ridge portion 3i. The first electrode layer E1 included in the electrode portion 5i is positioned on the ridge portion 3i.

The third electrode layer E3 included in the electrode portion 5i is disposed on the first electrode layer E1. In the electrode portion 5i, the third electrode layer E3 covers the entire first electrode layer E1. In the electrode portion 5i, the third electrode layer E3 is in contact with the entire first electrode layer E1. That is, in the electrode portion 5i, the third electrode layer E3 is in direct contact with the first electrode layer E1. The third electrode layer E3 included in the electrode portion 5i is positioned on the ridge portion 3i.

The fourth electrode layer E4 included in the electrode portion 5i is disposed on the third electrode layer E3. In the electrode portion 5i, the fourth electrode layer E4 covers the entire third electrode layer E3. In the electrode portion 5i, the fourth electrode layer E4 is in contact with the entire third electrode layer E3. That is, in the electrode portion 5i, the fourth electrode layer E4 is in direct contact with the third electrode layer E3. The fourth electrode layer E4 included in the electrode portion 5i is positioned on the ridge portion 3i.

The electrode portion 5i is three-layered.

The electrode portion disposed on the ridge portion 3j is four-layered similarly to the electrode portions 5a, 5c, and 5e. The electrode portion disposed on the ridge portion 3j may be four-layered similarly to the electrode portions 5g and 5i.

As described above, the external electrode 5 includes the first electrode layer E1, the second electrode layer E2, the third electrode layer E3, and the fourth electrode layer E4. The first electrode layer E1 is disposed on the pair of side surfaces 3a, on the pair of side surface 3c, and on the end surface 3e. The second electrode layer E2 is disposed on the first electrode layer E1 in such a manner that a partial region of the first electrode layer E1 is exposed from the second electrode layer E2. The third electrode layer E3 is disposed on the first electrode layer E1 and second electrode layer E2 to cover the second electrode layer E2 and the partial region of the first electrode layer E1 exposed from the second electrode layer E2. The fourth electrode layer E4 is disposed on the third electrode layer E3 to cover the entire third electrode layer E3. That is, the plating layer PL is disposed on the first electrode layer E1 and second electrode layer E2 to cover the second electrode layer E2 and the partial region of the first electrode layer E1 exposed from the second electrode layer E2.

For example, in a case where the second electrode layer E2 included in the electrode portion 5a constitutes a first portion, the plating layer PL (third electrode layer E3 and fourth electrode layer E4) included in the electrode portion 5a constitutes a second portion, the first electrode layer E1 included in the electrode portion 5a constitutes a third portion, and the first electrode layer E1 included in the electrode portion 5g constitutes a fourth portion. For example, in a case where the second electrode layer E2 included in the electrode portion 5c constitutes a first portion, the plating layer PL (third electrode layer E3 and fourth electrode layer E4) included in the electrode portion 5c constitutes a second portion, the first electrode layer E1 included in the electrode portion 5c constitutes a third portion, and the first electrode layer E1 included in the electrode portion 5i constitutes a fourth portion.

The first electrode layer E1 is formed by sintering electrically conductive paste applied onto the outer surface of the element body 3. The first electrode layer E1 is formed to continuously cover the pair of the side surface 3a, the pair of side surface 3c, and the end surface 3e. The first electrode layer E1 is formed from sintering a metal component (metal powder) contained in the electrically conductive paste. The first electrode layer E1 includes a metal layer. The first electrode layer E1 includes a metal layer formed on the element body 3. In the present embodiment, the first electrode layer E1 includes a sintered metal layer made of Cu. That is, the first electrode layer E1 includes sintered copper. The electrically conductive paste contains, for example, powder made of Cu, a glass component, an organic binder, and an organic solvent. The first electrode layers E1 included in the electrode portions 5a, 5c, 5e, 5g, and 5i are integrally formed. The powder made of Cu includes, for example, cupper particle.

As illustrated in FIG. 6, glass GL exists between the respective ridge portions 3g and 3i and the first electrode layer E1 located on the respective ridge portions 3g and 3i. In the present embodiment, the first electrode layer E1 is disposed on the glass GL. The glass GL includes, for example, a glass component contained in the electrically conductive paste. The glass GL may cover all the respective ridge portions 3g and 3i. The glass GL may cover only a part of each of the ridge portions 3g and 3i. That is, each of the ridge portions 3g and 3i may include a portion exposed from the glass GL. In this case, each of the ridge portions 3g and 3i may be in contact with the first electrode layer E1 at the portion exposed from the glass GL.

The second electrode layer E2 is formed from curing electrically conductive resin paste applied onto the first electrode layer E1. The second electrode layer E2 is formed on the first electrode layer E1. In the present embodiment, the second electrode layer E2 is formed on the first electrode layer E1 included in each of the electrode portions 5a, 5c, and 5e. The first electrode layer E1 is an underlying metal layer for forming the second electrode layer E2. The second electrode layer E2 is a conductive resin layer covering the first electrode layer E1. The second electrode layer E2 includes an electrically conductive resin layer. The electrically conductive resin paste contains, for example, an electrically insulating resin, electrically conductive fillers, and an organic solvent. The resin is, for example, a thermosetting resin. The electrically conductive fillers include copper particles. The thermosetting resin includes, for example, a phenolic resin, an acrylic resin, a silicone resin, an epoxy resin, or a polyimide resin. The first electrode layers E2 included in the electrode portions 5a, 5c, and 5e may be integrally formed.

As illustrated in FIG. 7, the second electrode layer E2 includes a plurality of copper particles CP and an electrically insulating resin R. The plurality of copper particles CP forms a plurality of electrically conductive paths in the second electrode layer E2. Apart of the plurality of copper particles CP is in direct contact with the first electrode layer E1. Another part of the plurality of copper particles CP is exposed to a surface of the second electrode layer E2. The copper particles CP exposed to the surface of the second electrode layer E2 is in direct contact with the third electrode layer E3. The plurality of copper particles CP electrically connects the first electrode layer E1 and the third electrode layer E3. The particle shape of the copper particle CP is not particularly limited. The copper particles CP have, for example, a substantially spherical shape, a substantially acicular shape, or a flaky shape.

An average aspect ratio of the plurality of copper particles CP is, for example, 1.1 or more. In the present embodiment, the average aspect ratio of the plurality of copper particles CP is 1.39.

The average aspect ratio of the plurality of copper particles CP can be obtained, for example, as follows.

A cross-sectional photograph of the external electrode 5 at a position including the second electrode layer E2 is acquired. The cross-sectional photograph includes a photograph of a cross section when the external electrode 5 is cut in a plane orthogonal to the end surface 3e. The cross-sectional photograph includes, for example, a photograph of a cross section of the external electrode 5 when cut in a plane parallel to a pair of surfaces opposing each other (for example, the pair of side surfaces 3c) and equidistant from the pair of surfaces. The acquired cross-sectional photograph is image-processed with software. Through this image processing, a boundary of the copper particles CP is determined, and a major axis length and a minor axis length of the copper particles CP are measured. In the present embodiment, the major axis length and the minor axis length are defined as follows. The major axis length is a maximum value among distances between two parallel lines drawn from various angles so as to be in contact with a contour (boundary) of the copper particles CP. That is, the major axis length is a maximum value of a ferret diameter. The minor axis length is a maximum value of lengths of the copper particles CP in a direction orthogonal to the major axis of the copper particles CP.

The major axis lengths and minor axis lengths of all the copper particles CP included in the cross-sectional photograph may be calculated. Of the copper particles CP included in the cross-sectional photograph, the major axis length and the minor axis length of any number of copper particles CP may be calculated. Any number is, for example, 100. Each average value of the obtained major axis lengths and minor axis lengths of the copper particles CP is calculated. An average aspect ratio (average major axis length/average minor axis length) is calculated based on the calculated average major axis length and average minor axis length.

The third electrode layer E3 is formed on the second electrode layer E2 through a plating method. In the present embodiment, the third electrode layer E3 is formed on the second electrode layer E2 from Ni plating. The third electrode layer E3 includes a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2. The third electrode layer E3 covers the second electrode layer E2.

The fourth electrode layer E4 is formed on the third electrode layer E3 through a plating method. The fourth electrode layer E4 includes a solder plating layer. In the present embodiment, the fourth electrode layer E4 is formed on the third electrode layer E3 from Sn plating. The fourth electrode layer E4 includes an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute the plating layer PL formed on the second electrode layer E2. In the present embodiment, the plating layer PL is two-layered. The plating layer PL covers the second electrode layer E2. The third electrode layer E3 is an intermediate plating layer positioned between the fourth electrode layer E4 and the second electrode layer E2. The third electrode layers E3 included in the electrode portions 5a, 5c, 5e, 5g, and 5i are integrally formed. The fourth electrode layers E4 included in the electrode portions 5a, 5c, 5e, 5g, and 5i are integrally formed.

A description will be given of a configuration of the external electrode 5 on the side surface 3a with reference to FIG. 8. As described above, on the side surface 3a, the external electrode 5 includes the first electrode layer E1, the second electrode layer E2, and the plating layer PL (third electrode layer E3 and fourth electrode layer E4).

On the side surface 3a, a thickness $T_{E2}$ of the second electrode layer E2 is smaller than a thickness $T_{PL}$ of the plating layer PL. In the present embodiment, a thickness $T_{E1}$ of the first electrode layer E1 is smaller than the thickness $T_{E2}$. The thickness $T_{E2}$ is, for example, 2 μm or more and 10 μm or less. In the present embodiment, the thickness $T_{E2}$ is 8 μm. The thickness $T_{PL}$ is, for example, 9 μm or more and 13 μm or less. In the present embodiment, the thickness $T_{PL}$, is 10 μm. The thickness $T_{E1}$ is, for example, 1 μm or more and 11 μm or less. In the present embodiment, the thickness $T_{E1}$ is 3 μm.

For example, the thickness $T_{E2}$ is defined by the maximum thickness of the second electrode layer E2 included in the electrode portion 5a, and the thickness $T_{PL}$ is defined by the maximum thickness of the plating layer PL included in the electrode portion 5a. The thickness $T_{E1}$ is defined by, for example, the maximum thickness of the first electrode layer E1 included in the electrode portion 5a.

The respective thicknesses $T_{E2}$, $T_{PL}$, and $T_{E1}$ can be obtained, for example, as follows.

A cross-sectional photograph of the external electrode 5 at a position including the electrode portion 5a is acquired. The cross-sectional photograph includes, for example, a photograph of the cross section of the external electrode 5 when cut in a plane parallel to the pair of side surfaces 3c opposing each other and equidistant from the pair of side surfaces 3c. The acquired cross-sectional photograph is image-processed with software. Through this image processing, each boundary of the first electrode layer E1, the second electrode layer E2, and the plating layer PL is discriminated, and each maximum thicknesses of the first electrode layer E1, the second electrode layer E2, and the plating layer PL is obtained.

Instead of obtaining the maximum thickness, each average thickness of the first electrode layer E1, the second electrode layer E2, and the plating layer PL may be obtained. In this case, the thickness $T_{E2}$ is defined by the average thickness of the second electrode layer E2 included in the electrode portion 5a, and the thickness $T_{PL}$ is defined by the average thickness of the plating layer PL included in the electrode portion 5a. The thickness $T_{E1}$ is defined by the average thickness of the first electrode layer E1 included in the electrode portion 5a.

Although not illustrated, in the present embodiment, on the side surface 3c, the thickness of the second electrode layer E2 is smaller than the thickness of the plating layer PL, and the thickness of the first electrode layer E1 is smaller than the thickness of the second electrode layer E2. The thickness of the second electrode layer E2 included in the electrode portion 5c is, for example, equivalent to the thickness $T_{E2}$. The thickness of the plating layer PL included in the electrode portion 5c is, for example, equivalent to the thickness $T_{PL}$. The thickness of the first electrode layer E1 included in the electrode portion 5c is, for example, equivalent to the thickness $T_{E1}$.

For example, the thickness of the second electrode layer E2 included in the electrode portion 5c is defined by the maximum thickness of the second electrode layer E2 included in the electrode portion 5c, and the thickness of the plating layer PL included in the electrode portion 5c is defined by the maximum thickness of the plating layer PL included in the electrode portion 5c. The thickness of the first electrode layer E1 included in the electrode portion 5c is defined by the maximum thickness of the first electrode layer E1 included in the electrode portion 5c. Each thickness of the second electrode layer E2, the plating layer PL, and the first electrode layer E1 included in the electrode portion 5c may be defined by the average thickness in the same manner as the respective thicknesses $T_{E2}$, $T_{PL}$, and $T_{E1}$.

Next, a detailed description will be given of a relation between the respective thicknesses $T_{E2}$, $T_{PL}$, and $T_{E1}$.

The present inventors conducted the following tests in order to clarify the relationship between the thicknesses $T_{E2}$, $T_{PL}$, and $T_{E1}$. That is, the present inventors prepared samples S1 to S3 having different thicknesses $T_{E2}$, $T_{PL}$, and $T_{E1}$, and determined an occurrence of a flex crack and an equivalent series resistance (ESR) in each of the samples S1 to S3. Results are illustrated in FIG. 9. FIG. 9 is a table illustrating the occurrence of the flex crack and the ESR in each sample.

Each of the samples S1 to S3 is a lot including a plurality of specimens. Specimens of the respective samples S1 to S3 are multilayer capacitors having the same configuration except that the respective thicknesses $T_{E2}$, $T_{PL}$, and $T_{E1}$ are different. In each specimen of the samples S1 to S3, the height of the element body 3 is 1.6 mm, the width of the element body 3 is 1.6 mm, and the length of the element body 3 is 3.2 mm. A capacitance of each specimen is 2.2 μF.

In each specimen of the sample S1, the thickness $T_{E2}$ is 8 μm, the thickness $T_{PL}$ is 10 μm, and the thickness $T_{E1}$ is 3 μm. In each specimen of the sample S1, the respective thicknesses $T_{E2}$, $T_{PL}$, and $T_{E1}$ have a relationship represented by "thickness $T_{PL}$>thickness $T_{E2}$>thickness $T_{E1}$".

In each specimen of the sample S2, the thickness $T_{E2}$ is 12 μm, the thickness $T_{PL}$ is 8 μm, and the thickness $T_{E1}$ is 3 μm. In each specimen of the sample S1, the respective thicknesses $T_{E2}$, $T_{PL}$, and $T_{E1}$ have a relationship represented by "thickness $T_{E2}$>thickness $T_{PL}$>thickness $T_{E2}$".

In each specimen of the sample S3, the thickness $T_{E2}$ is 4 μm, the thickness $T_{PL}$ is 11 μm, and the thickness $T_{E1}$ is 9 μm. In each specimen of the sample S1, the respective thicknesses $T_{E2}$, $T_{PL}$, and $T_{E1}$ have a relationship represented by "thickness $T_{PL}$>thickness $T_{E1}$>thickness $T_{E2}$".

The occurrence of the flex crack is determined as follows. For each of the samples S1 to S3, ten specimens are selected, and a flexural strength test is performed on each specimen. In the flexural strength test, first, the specimens are solder-mounted at a center of a substrate (glass epoxy substrate). The size of the substrate is 100 mm×40 mm, and the thickness of the substrate is 1.6 mm Next, the substrate is placed on two rods disposed in parallel with an interval of 90 mm. The substrate is placed so that a surface on which the specimens are mounted faces downward. Thereafter, a flex stress is applied to the center of the substrate from a back side of the surface on which the specimen is mounted so that the amount of flex of the substrate becomes a desired value. In this test, the amount of flex of the substrate is 10 mm.

After the flexural strength test, the specimen in the state of being solder-mounted on the substrate is embedded in a resin, and the specimen in the state of being embedded in the resin is polished together with the solder and the substrate. Whether a crack occurs on a polished surface in an element body of the specimen is determined using an optical microscope.

The ESR is obtained as follows.

For each of the samples S1 to S3, five specimens are selected, and after each of the specimens is solder-mounted on a substrate, an ESR (mΩ) at a self-resonant frequency is measured. The ESR is measured by an impedance analyzer (4294A manufactured by Agilent Technologies). As a test fixture, 16044A manufactured by Agilent Technologies is used. For each of the samples S1 to S3, an average value of the five specimens is obtained. Considering actual use, the ESR needs to be less than 10 mΩ. When the ESR is less than 8 mΩ, the characteristics are further improved.

As a result of the above-mentioned test, as illustrated in FIG. 9, no flex crack occurrence was observed in the samples S1 and S2. In contrast, in sample S3, flex crack occurrence was observed in one specimen.

In the samples S1 and S3, the ESR was less than 8 mΩ. In sample S2, the ESR was 10 mΩ or more.

Next, a detailed description will be given of an average aspect ratio of the plurality of copper particles CP.

The present inventors conducted the following test in order to clarify a range of the average aspect ratio of the plurality of copper particles CP. That is, the present inventors prepared samples S4 to S6 having different average aspect ratios of the plurality of copper particles CP, and determined the ESR in each of the samples S4 to S6. Results are illustrated in FIG. 10. FIG. 10 is a table illustrating the ESR in each sample.

Each of the samples S4 to S6 is a lot including a plurality of specimens. Specimens of the respective samples S4 to S6 are multilayer capacitors having the same configuration except that the average aspect ratios of the plurality of copper particles CP are different. In each specimen of the samples S4 to S6, the height of the element body 3 is 1.6 mm, the width of the element body 3 is 1.6 mm, and the length of the element body 3 is 3.2 mm. The capacitance of each specimen is 2.2 µF. The thickness $T_{E2}$ is 8 µm, the thickness $T_{PL}$ is 10 µm, and the thickness $T_{E1}$ is 3 µm.

In each specimen of the sample S4, the average aspect ratio of the plurality of copper particles CP is 1.12.

In each specimen of the sample S5, the average aspect ratio of the plurality of copper particles CP is 1.39.

In each specimen of the sample S6, the average aspect ratio of the plurality of copper particles CP is 1.63.

The ESR is obtained as follows.

For each of the samples S4 to S6, five specimens are selected, and after each of the specimens is solder-mounted on a substrate, an ESR (mΩ) at a self-resonant frequency is measured. Here, the ESR is measured by an impedance analyzer (4294A manufactured by Agilent Technologies). As a test fixture, 16044A manufactured by Agilent Technologies is used. For each of the samples S4 to S6, an average value of the five specimens is obtained. Considering actual use, the ESR needs to be less than 10 mΩ. When the ESR is less than 8 mΩ, the characteristics are further improved.

As a result of the above-mentioned test, as illustrated in FIG. 10, in the samples S4 to S6, the ESR was less than 10 mΩ. Further, in the samples S5 and S6, the ESR was less than 8 mΩ.

When an electronic device flexes in a state where the multilayer capacitor C1 is solder-mounted on the electronic device, flex stress may act on the multilayer capacitor C1 from the electronic device. In this case, a flex crack may occur in the element body 3. The stress tends to act on, for example, the side surfaces 3a and 3c of the element body 3. The stress tends to act on, for example, the side surface 3a arranged to constitute the mounting surface.

The electrode portion 5a of the external electrode 5 includes the second electrode layer E2. Therefore, the stress acting on the multilayer capacitor C1 from the electronic device tends not to act on the element body 3 (side surface 3a). Consequently, the multilayer capacitor C1 reliably controls the occurrence of the flex crack.

The electrode portion 5c of the external electrode 5 also has the second electrode layer E2. Therefore, the stress acting on the multilayer capacitor C1 from the electronic device is also unlikely to act on the element body 3 (side surface 3c). As a result, the multilayer capacitor C1 more reliably suppresses the occurrence of the flex crack.

The second electrode layer E2 contains the resin R. Therefore, the electrical resistance of the second electrode layer E2 is higher than the electrical resistance of the first electrode layer E1 and the plating layer PL.

The second electrode layer E2 is disposed on the first electrode layer E1 in such a manner that the partial region of the first electrode layer E1 is exposed. For example, in the present embodiment, the first electrode layer E1 included in the electrode portions 5g and 5i is exposed from the second electrode layer E2. The third electrode layer E3 is disposed on the first electrode layer E1 and on the second electrode layer E2 to cover the second electrode layer E2 and the partial region of the first electrode layer E1 exposed from the second electrode layer E2. For example, in the present embodiment, the plating layer PL is disposed on the first electrode layer E1 included in the electrode portions 5g and 5i. Therefore, a current path not passing through the second electrode layer E2 is formed between the plating layer PL and the first electrode layer E1. Consequently, the multilayer capacitor C1 controls an increase in electrical resistance.

In the multilayer capacitor C1, the thickness $T_{E2}$ is smaller than the thickness $T_{PL}$. Therefore, the current path formed by the copper particles CP in the second electrode layer E2 is extremely short. Consequently, the multilayer capacitor C1 reduces the electrical resistance even in a case where the external electrode 5 includes the second electrode layer E2.

In the multilayer capacitor C1, the thickness of the second electrode layer E2 included in the electrode portion 5c is also smaller than the thickness of the plating layer PL included in the electrode portion 5c. Therefore, the multilayer capacitor C1 further reduces the electrical resistance.

Stress generated when the plating layer PL is formed may act on the second electrode layer E2 included in the electrode portions 5a and 5c. In a case where this stress acts on the second electrode layer E2, the second electrode layer E2 included in the electrode portions 5a and 5c may peel off from the element body 3. The smaller the thickness (thickness $T_{E2}$) of the second electrode layer E2 included in the electrode portions 5a and 5c, the easier it is for the second electrode layer E2 to peel off. In this case, migration due to metal particles contained in the second electrode layer E2 tends to occur.

The second electrode layer E2 contains the copper particles CP as metal particles. Therefore, in the multilayer capacitor C1, migration tends not to occur as compared with in a configuration in which the second electrode layer E2 contains silver particles as metal particles. Consequently, in the multilayer capacitor C1, a short circuit between the external electrodes 5 tends not to occur.

The configuration in which the thickness $T_{E2}$ is smaller than the thickness $T_{PL}$, can easily realize a lower profile of the multilayer capacitor C1 as compared with a configuration in which the thickness $T_{E2}$ is greater than or equal to the thickness $T_{PL}$.

In the multilayer capacitor C1, the thickness $T_{E1}$ is smaller than the thickness $T_{E2}$.

The stress acting on the multilayer capacitor C1 from the electronic device acts on the element body 3 (side surface 3a) from the first electrode layer E1. The larger the thickness $T_{E1}$, the greater the stress acting on the element body 3. In the configuration in which the thickness $T_{E1}$ is smaller than the thickness $T_{E2}$, the stress acting on the element body 3 (side surface 3a) is small. Therefore, the multilayer capacitor C1 more reliably controls the occurrence of the flex crack.

The thickness of the first electrode layer E1 included in the electrode portion 5c is also smaller than the thickness of the second electrode layer E2 included in the electrode portion 5c.

The stress acting on the multilayer capacitor C1 from the electronic device may act on the side surface 3c from the first electrode layer E1. Also in this case, the larger the thickness of the first electrode layer E1 included in the electrode portion 5c, the greater the stress acting on the element body 3. In the configuration in which the thickness of the first electrode layer E1 included in the electrode portion 5c is smaller than the thickness of the second electrode layer E2 included in the electrode portion 5c, the stress acting on the side surface 3c is also small. Therefore, the multilayer capacitor C1 more reliably controls the occurrence of the flex crack.

In the multilayer capacitor C1, the average aspect ratio of the plurality of copper particles CP is 1.1 or more.

In a configuration in which the average aspect ratio of the plurality of copper particles CP is less than 1.1, the surface of the copper particles CP tends to be oxidized. In this case, the electrical resistance of the second electrode layer E2 may increase. In contrast, in the configuration in which the average aspect ratio of the plurality of copper particles CP is 1.1 or more, the electrical resistance of the second electrode layer E2 tends not to increase.

In the multilayer capacitor C1, the first electrode layer E1 included in the electrode portions 5g and 5i is exposed from the second electrode layer E2.

The second electrode layer E2 alleviates stress acting on a solder fillet formed on the external electrode 5 and controls an occurrence of a solder crack. The stress acting on the solder fillet tends to be concentrated on the solder fillet formed on the electrode portions 5a, 5c, and 5e. In contrast, stress tends not to act on the solder fillet formed on the electrode portions 5g and 5i.

As described above, even though the stress acting on the multilayer capacitor C1 from the electronic device tends to act on the side surfaces 3a and 3c and the end surface 3e, and tends not to act on the ridge portions 3g and 3i. In the configuration in which the first electrode layer E1 included in the electrode portions 5g and 5i is exposed from the second electrode layer E2, the first electrode layer E1 included in the electrode portions 5g and 5i is connected to the plating layer PL. Therefore, the multilayer capacitor C1 reduces the electrical resistance and controls the occurrence of the solder crack as well as the flex crack.

In the multilayer capacitor C1, the glass GL exists between the ridge portions 3g and 3i and the first electrode layer E1 included in the electrode portions 5g and 5i.

As described above, the element body 3 contains the oxide. Copper tends not to oxidize as compared with metal such as nickel or aluminum. In this case, the first electrode layer E1 made of sintered copper tends not to be chemically connected to the element body containing the oxide.

In the configuration in which the glass GL exists between the ridge portions 3g and 3i and the first electrode layer E1 included in the electrode portions 5g and 5i, the element body 3 and the first electrode layer E1 are firmly connected at the ridge portions 3g and 3i. Therefore, the element body 3 and the external electrode 5 are firmly connected.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being positioned on another element, the element may be directly positioned on the other element or be indirectly positioned on the other element. In a case where an element is indirectly positioned on another element, an intervening element is present between the element and the other element. In a case where an element is directly positioned on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

Although the embodiment and modifications of the present invention have been described above, the present invention is not necessarily limited to the embodiment and modifications, and the embodiment can be variously changed without departing from the scope of the invention.

The thickness of the second electrode layer E2 included in the electrode portion 5c may be equal to or greater than the thickness of the plating layer PL included in the electrode portion 5c. The configuration in which the thickness of the second electrode layer E2 included in the electrode portion 5c is smaller than the thickness of the plating layer PL included in the electrode portion 5c further reduces the electrical resistance, as described above.

The thickness $T_{E1}$ may be greater than or equal to the thickness $T_{E2}$. The configuration in which the thickness $T_{E1}$ is smaller than the thickness $T_{E2}$ further reliably controls the occurrence of the flex crack, as described above.

The thickness of the first electrode layer E1 included in the electrode portion 5c may be greater than or equal to the thickness of the second electrode layer E2 included in the electrode portion 5c. The configuration in which the thickness of the first electrode layer E1 included in the electrode portion 5c is smaller than the thickness of the second electrode layer E2 included in the electrode portion 5c further reliably controls the occurrence of the flex crack, as described above.

The average aspect ratio of the plurality of copper particles CP may be less than 1.1. As described above, the electrical resistance of the second electrode layer E2 tends not to increase in the configuration in which the average aspect ratio of the plurality of copper particles CP is 1.1 or more.

The first electrode layer E1 included in the electrode portions 5g and 5i may not be exposed from the second electrode layer E2. In this case, the first electrode layer E1 included in the electrode portion 5a may be exposed from the second electrode layer E2, the first electrode layer E1 included in the electrode portion 5c may be exposed from the second electrode layer E2, or the first electrode layer E1 included in the electrode portion 5e may be exposed from the second electrode layer E2. In any case, a partial region of the first electrode layer E1 may be exposed from the second electrode layer E2. The configuration in which the first electrode layer E1 included in the electrode portions 5g and 5i is exposed from the second electrode layer E2 reduces the electrical resistance and controls the occurrence of the solder crack as well as the flex crack, as described above.

The glass GL may not exist between the ridge portions 3g and 3i and the first electrode layer E1 included in the electrode portions 5g and 5i. In the configuration in which the glass GL exists between the ridge portions 3g and 3i and the first electrode layer E1 included in the electrode portions 5g and 5i, the element body 3 and the external electrode 5 are firmly connected, as described above.

The electronic components of the present embodiment is the multilayer capacitors. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
an element body of a rectangular parallelepiped shape including four side surfaces and two end surfaces; and
a pair of external electrodes, wherein each external electrode is formed on the four side surfaces, and one of said external electrodes is formed on one end surface and the other of said external electrodes is formed on the other end surface,
wherein each external electrode includes:
a metal layer disposed on the four side surfaces and each end surface and made of sintered copper;
a conductive resin layer that is disposed on the metal layer in such a manner that a partial region of the metal layer is exposed and contains a plurality of copper particles and a resin; and
a plating layer disposed on the partial region of the metal layer and the conductive resin layer,
the conductive resin includes four first portions each located on a corresponding side surface of the four side surfaces,
the plating layer includes four second portions each located on the corresponding side surface,
a thickness of each of the four first portions is smaller than a thickness of each of the four second portions,
each of the four second portions includes, at an end thereof, a surface opposing the corresponding side surface in a direction orthogonal to the corresponding side surface, and
the surface included in each of the four second portions is separated from the corresponding side surface.

2. The electronic component according to claim 1,
wherein the metal layer includes four third portions each located on the corresponding side surface, and
a thickness of each of the four third portions is smaller than the thickness of each of the four first portions.

3. The electronic component according to claim 1, wherein an average aspect ratio of the plurality of copper particles is 1.1 or more.

4. The electronic component according to claim 1,
wherein the element body includes four ridge portions each between the corresponding side surface and each end surface, and
the partial region of the metal layer includes four fourth portions located on a corresponding ridge portion of the four ridge portions.

5. The electronic component according to claim 4, wherein glass exists between each of the four ridge portions and each of the four fourth portions.

* * * * *